United States Patent [19]
Hu et al.

[11] Patent Number: 5,929,324
[45] Date of Patent: *Jul. 27, 1999

[54] APPARATUS FOR DETECTING LEAKAGE IN A GAS REACTOR

[75] Inventors: Tien Chen Hu, Ping-Tung; Philip Jan Lin, Hsin Chu, both of Taiwan

[73] Assignee: Taiwan Semiconductor Manufacturing Co., Ltd., Hsin-Chu, Taiwan

[ * ] Notice: This patent is subject to a terminal disclaimer.

[21] Appl. No.: 08/958,055

[22] Filed: Oct. 27, 1997

Related U.S. Application Data

[63] Continuation-in-part of application No. 08/908,882, Aug. 8, 1997.

[51] Int. Cl.⁶ .............................. G01M 3/26; C01B 13/10; B01D 24/00; B01J 14/08
[52] U.S. Cl. ...................... 73/40; 204/176; 422/186.07; 210/760
[58] Field of Search ................................ 73/40.7, 40.5 R; 204/176; 422/186.07; 210/760

[56] References Cited

U.S. PATENT DOCUMENTS

| | | | |
|---|---|---|---|
| 3,695,094 | 10/1972 | Hulme | 73/40.5 R |
| 4,106,099 | 8/1978 | Elliott et al. | 702/45 |
| 5,106,589 | 4/1992 | Conrad | 422/186.15 |
| 5,439,026 | 8/1995 | Moriya et al. | 137/486 |

*Primary Examiner*—Michael Brock
*Assistant Examiner*—Jay L. Politzer
*Attorney, Agent, or Firm*—Tung & Associates

[57] ABSTRACT

The present invention discloses a gas generating device that is equipped with a gas leakage detection and control system which includes a multiple number of gas generating units each equipped with flow sensors for detecting flow rates in and out of the unit and a unit controller. The gas generating device is controlled by a main controller so that when leakage in a generating unit is detected, the unit is shut off and bypassed while the outputs of the other generating units can be increased to make up the shortage such that such that the total output from the gas generating device is not affected. The present invention novel apparatus further provides the capability that any leakage in the piping system which connects the multiple number of generating units can be detected by using flow sensors installed in a main gas inlet and a main gas outlet such that the total gas flow rates coming in and going out can be continuously monitored.

13 Claims, 1 Drawing Sheet

APPARATUS FOR DETECTING LEAKAGE IN A GAS REACTOR

REFERENCE TO A COPENDING APPLICATION

This is a continuation-in-part of copending U.S. patent application Ser. No. 08/908,882, filed on Aug. 8, 1997 (Attorney Docket No. 67,200-057).

FIELD OF THE INVENTION

The present invention generally relates to an apparatus and a method for detecting gas leakage from a gas reactor and more particularly, relates to an apparatus and a method for detecting ozone leakage from an ozone generator by comparing a gas flow rate in a gas inlet and a gas flow rate in a gas outlet of an ozone generating unit connected in parallel with other ozone generating units that is capable of detecting not only a leakage in the generating unit but also a leakage in the piping connecting the units by shutting off either the single unit or the whole apparatus.

BACKGROUND OF THE INVENTION

In the fabrication process for integrated circuit devices, various chemicals including gases and liquids are utilized. One of the gases utilized as a reactant in a silicon oxide deposition process or as a cleaning agent for a wafer surface is ozone. For instance, silicon oxide films can be deposited onto semiconductor wafers at atmospheric pressure and at low deposition temperatures by reacting tetraethoxysilane (TEOS) with ozone. Ozone is used as an reactant to produce films which exhibit smooth profiles over steps and therefore is suitable for filling high aspect ratio gaps between metal lines. Silicon oxide films produced by ozone and TEOS is most suitable as inter-metal dielectrics.

Ozone has also been used as an effective cleaning agent for wafer surfaces. For instance, after a photolithographic process, a photoresist layer can be stripped by the combination of a dry ashing process with ozone and then a wet cleaning process with a mixture of $H_2SO_4$ and $H_2O_2$. In the process, most of the organic residue from the photoresist can be removed in the ozone ashing process while wet cleaning is used to render the wafer surface completely clean. In another process that utilizes ozone for cleaning, ultrapure water injected with ozone can be used to clean wafer surfaces. When ozone is first dissolved in ultrapure water, ozone decomposes and becomes a strong oxidizing agent capable of decomposing organic impurities. The ozone-injected ultrapure water cleaning process therefore provides the advantages of a lower cleaning temperature, a simplified process, and a reduced chemical consumption. There is, however, a side effect with the ozone cleaning process in that native oxide may grow on the wafer surface at high ozone concentrations. After an ozone cleaning process is completed on a wafer surface, the organic contaminant-free surface resulting from the ozone treatment further helps subsequent cleaning steps to function properly. Overall, the ozone-injected ultrapure water cleaning process is an effective method to remove all organic impurities on a wafer surface. It can be carried out at room temperature and can be used to replace a conventional $H_2SO_4/H_2O_2$ wet cleaning process.

Ozone is a triatomic allotrope of oxygen which has a characteristic pungent odor. Ozone is produced naturally in the earth's stratosphere by the absorption of solar radiation into oxygen. Ozone is also present in the earth atmosphere in low concentration as a consequent of intrusions of stratospheric air. Since ozone exists in an unstable state, it decomposes into oxygen at normal temperature and pressure. Such characteristic enables ozone to be a powerful oxidizing agent. Its strong ability to oxidize has been utilized in the fabrication processes for integrated circuit devices whenever an oxidation process is desired.

In a semiconductor fabrication facility, ozone is normally generated by a static discharge method such that a large quantity of ozone in high concentration can be produced for production use. In the static discharge technique, an oxygen gas is passed through inbetween two electrodes which are coated by a ceramic dielectric material and are separated by a narrow gap formed inbetween. The electrode arrangement is known as a discharge cell. The reaction to form ozone can be initiated when a voltage is applied to the discharge cell. Oxygen molecules are decomposed into oxygen atoms from collisions between the electrons and the oxygen molecules. The active oxygen atoms then recombine with surrounding oxygen molecules to form ozone. The reaction can be expressed as $3\ O_2 \rightarrow 2\ O_3$. The ozone synthesis process proceeds in an equilibrium chemical reaction. The reaction rate increases as the reaction temperature is increased. Since most of the energy applied to the discharge cell is converted to heat and that if heat is not removed, the ozone produced will be destructed at the high temperature. As a consequence, the discharge cell for ozone production must be efficiently cooled by a heat exchanger.

In order to supply a large enough volume of ozone for production use in a semiconductor fabrication plant, a series of ozone generating units (each unit in turn consists of a multiple number of generating cells) are connected together in parallel so that a high concentration and large volume of ozone can be produced for supplying to a deposition or cleaning process. With the increasing number of ozone generating units used, the chances of having ozone leaks from one or more of the units become significantly higher. When ozone leaks from a generating unit occur in a semiconductor fabrication plant, several problems can result due to the leakage. First, since ozone breaks down easily into oxygen at normal temperatures and pressures, and oxygen helps combustion of many flammable materials which are used in a semiconductor fabrication plant, ozone leakage presents a serious fire and explosion hazard. Secondly, the inhalation of ozone into human body produces a various health hazard that may be detrimental to the machine operators. Thirdly, Ozone has an unpleasant, pungent odor that is objectionable to most people. Unfortunately, commercially available ozone generators or generating units are not equipped with leakage detectors which can be used to effectively detect ozone leakage and thus enable an operator to correct the problem.

In addition to the need of detecting ozone leakage at a generating unit by installing flow sensors attached to the inlet and outlet of the unit, it is also desirable to design a system that takes remedial actions when leakage is detected in one or more generating units. The use of a main controller is therefore desirable which takes into account the loss of ozone production from the generating units that are shut down by increasing the output of the other ozone generator units so that the total output is maintained and the fabrication process is not affected.

In addition to the capabilities of detecting a leakage in an ozone generating unit, and of taking remedial actions for maintaining a constant output of zone, it is further desirable that other potential leakages that does not occur in a generating unit can also be detected and that remedial actions can be taken to stop the leakage. For instance, potential leakages may occur in the piping system that connects the generating units together to a main reactant gas input line and a main product gas output line. Such leakage if not detected can also cause severe problems to the fabrication process.

It is therefore an object of the present invention to provide a gas generating device equipped with a gas leakage detection and control system that does not have the drawbacks or shortcomings of the conventional gas leakage detection system.

It is another object of the present invention to provide a gas generating device equipped with a gas leakage detection and control system that is not only capable of detecting leakages from individual generating units but also capable of detecting leakages in the piping system that connects the individual generating units.

It is a further object of the present invention to provide a gas generating device that is equipped with a gas leakage detection and control system having a series of sub-controllers for controlling each individual generating unit and also a main controller for controlling the complete system.

It is another further object of the present invention to provide a gas generating device that is equipped with a gas leakage detection and control system that is capable of shutting off individual generating unit when a leakage is detected in such unit and then through the operation of a main controller, to increase the output of the other generating units such that the total gas output from the generating system is not affected.

It is still another object of the present invention to provide a gas generating device that is equipped with a gas leakage detection and control system that is capable of shutting off the whole system when a leakage is detected in the piping system that connects the individual generating units by detecting and comparing a flow rate in a main gas inlet and a flow rate in a main gas outlet.

It is yet another object of the present invention to provide a gas generating device that is equipped with a gas leakage detection and control system that utilizes a multiple number of subcontrollers and a main controller to operate air actuated valves for opening or closing of gas inlets and gas outlets to each generating unit and a main gas inlet and a main gas outlet for the gas generating device.

It is still another further object of the present invention to provide a method for detecting an ozone leak from an ozone generator that is capable of detecting not only leaks in each ozone generating unit, but also leaks in the piping system that connects the generating unit.

It is yet another further object of the present invention to provide a method for detecting an ozone leak from an ozone generator that is not only capable of detecting leaks from individual ozone generating units but also capable of taking remedial actions by shutting down the leaking unit while increasing the outputs from the other generating units such that the total output from the ozone generator is maintained.

SUMMARY OF THE INVENTION

In accordance with the present invention, a gas generating device equipped with a gas leakage detection and control system which is capable of not only shutting off a gas generating unit when a leakage is detected in the unit but also increasing the outputs from the other non-leaking generating units such that the total output of the generating device is not affected is provided.

In a preferred embodiment, a gas generating device that is equipped with a gas leakage detection and control system can be provided which includes at least two gas generating units connected in parallel each including; a gas inlet for feeding a reactant gas to the unit, a gas outlet for withdrawing a product gas from the unit, a first flow sensor in fluid communication with the gas inlet for outputting a first signal indicative of a flow rate in the gas inlet, a second flow sensor in fluid communication with the gas outlet for outputting a second signal indicative of a flow rate in the gas outlet, a unit controller for comparing the first signal to the second signal and for determining a leakage status of the gas generating unit; a main gas inlet for parallelly connecting to the gas inlets of the at least two gas generating units, a main gas outlet for parallelly connecting to the gas outlets of the at least two gas generating units, wherein the main gas inlet and the main gas outlet are connected in fluid communication with a third flow sensor and a fourth flow sensor, respectively for sensing flow rates through the sensors and outputting a signal to a main controller. A main controller for receiving data from the at least two unit controllers and for shutting off gas inlet and gas outlet of at least one of the gas generating units when leakage is detected.

In another preferred embodiment, a gas generating device that is equipped with a gas leakage detection and control system is provided which includes at least two gas generating units connected in parallel each comprising, a gas inlet for feeding a reactant gas to the unit, a gas outlet for withdrawing a product gas from the unit, a first flow sensor in fluid communication with the gas inlet for outputting a first signal indicative of a flow rate in the gas inlet, a second flow sensor in fluid communication with the gas outlet for outputting a second signal indicative of a flow rate in the gas outlet, a unit controller for comparing the first signal to the second signal and for determining a leakage status of the gas generating unit; a main gas inlet for parallelly connecting to the gas inlets of the at least two gas generating units, a main gas outlet for parallelly connecting to the gas outlets of the at least two gas generating units, the main gas inlet and the main gas outlet are connected in fluid communication with a third sensor and a fourth sensor, respectively for sensing flow rates through the sensors and outputting a signal to a main controller, a main controller for receiving data from the at least two unit controllers, for shutting off a gas inlet and a gas outlet of at least one of the gas generating units when leakage is detected, for increasing output from the other one of the at least two gas generating units such that the flow rate through the main gas output remains substantially unchanged, and for receiving and comparing flow rate data from the third flow sensor and the fourth flow sensor and shutting off all gas generating units when said flow rate data are not the same.

The present invention further directs to a method for detecting an ozone leak from an ozone generator which can be carried out by the operating steps of first providing an ozone generator that includes a main controller and a multiple number of generating units, each of the units is equipped with an inlet, an outlet and a unit controller, then measuring a first flow rate in an inlet and a second flow rate in an outlet of a first generating unit and outputting the measurements from the unit controller to the main controller, and then shutting off the first generating unit when the first flow rate does not substantially equal the second flow rate by outputting a signal from the main controller to air actuated valves which controls the inlet and the outlet. The method may further include the step of, after shutting off the first generating unit, outputting signals from the main controller to at least one of the other generating units to increase the output such that the total output from the ozone generator remains substantially unchanged. The method may further include the step of comparing a main input to a main output from the zone generator and shutting off the generator when the main input and the main output are not substantially the same.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENTS

Figure 1:
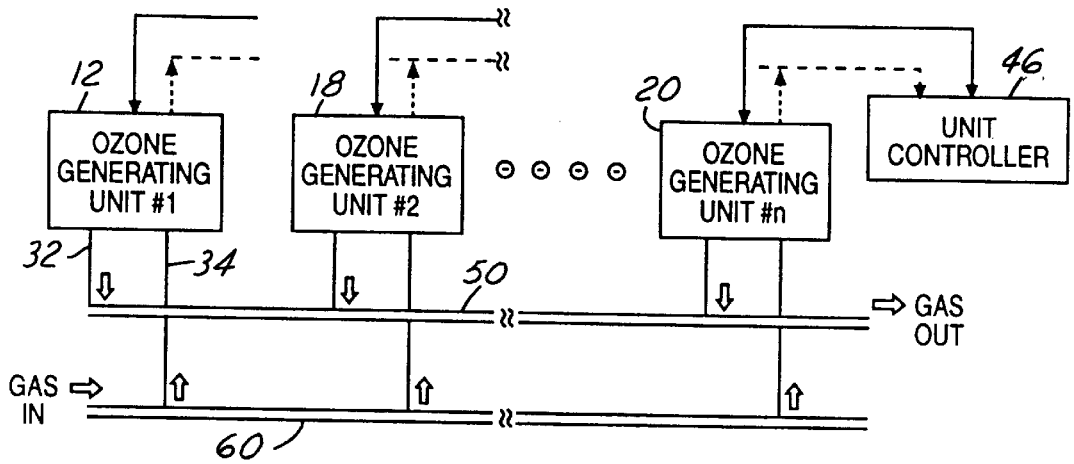
FIG. 1 is a schematic illustrating a parallel connection arrangement between the ozone generating units of the present invention and the main controller.

The present invention discloses an apparatus and a method for detecting gas leakage from a gas reactor by providing flow sensors to a gas inlet and a gas outlet of a gas generating unit that is one of the units connected in parallel to make up the gas reactor and monitoring the gas flow rates in the inlet and outlet such that any gas leakage in the specific generating unit can be detected when the flow rates monitored differ from each other, the apparatus further includes a main gas inlet and a main gas outlet and their associated flow sensors on the inlet and the outlet such that any gas leakage in the piping system connecting the generating units is also detected. The present invention further includes a main controller which is capable of shutting off a specific gas generating unit when a leakage is detected in such unit, and then increasing the outputs of the other generating units such that the total output from the gas generating apparatus is not affected. The present invention apparatus can be utilized for detecting any gas leakage from any type of gas reactors, however, it is particularly suitable for detecting ozone leakage from an ozone generating apparatus. Ozone leakage in a semiconductor fabrication facility can be hazardous both from a fire hazard standpoint and a worker health and safety hazard standpoint.

The present invention apparatus can be provided by a built-in flow sensor installed at the inlet end of an ozone generating unit, a built-in flow sensor installed at the outlet end of the generating unit and then monitoring the flow rates obtained from the sensors by a unit controller (or a sub-controller) of digital circuits. When the flow rates detected in the inlet and the outlet of an ozone generating unit are different, especially when the flow rate at the outlet end is smaller than the flow rate at the inlet end, it is likely that ozone leakage occurred in the generating unit (or in one of the generating cells) after the ozone formation process or oxygen leakage occurred in the generating unit before the ozone formation process. The flow sensors can be easily attached to the gas inlet and the gas outlet of each generating unit such that they are in fluid communication with the inlet and the outlet and that accurate flow rates can be measured during the operation of the unit. It should be noted that the assumption of zero leakage as indicated by the same flow rate is valid only if the conduits are of the same size. In any event, the volume of gas flowing in the conduit at the inlet end and at the outlet end should always be the same. When the readings from the flow sensors are different and are monitored by a unit controller and then sent to the main controller, an alarm will be triggered such that a display will flash at the control panel of the process machine. The main controller will then shut off the specific generating unit that has indicated a leak and bypass it to enable maintenance work to be performed on that specific generating unit. The present invention main controller also performs the function of increasing the output of the other generating units when one or more of the generating unit have been shut down for leakage reasons such that the total output from the ozone generator is not affected. The present invention apparatus can further detect, through additional flow sensors, the total flow into a main inlet and the total flow out of a main outlet and comparing them by a main controller such that when a difference in the flow rates is detected, i.e., which most likely indicates a leak in the piping systems that connects the generating units, the complete system can be shut down for inspection and repair.

In a semiconductor fabrication plant, the ozone generators are normally installed at a close proximity to a process machine which requires the usage of ozone. The generators may be installed at a different floor that is under the process machine for safety reasons. The ozone generated from the ozone generator is piped to the process machine through the floor of the plant. In a typical semiconductor fabrication equipment lay-out, a series of ozone generating units are used for each process machine or for a series of process machines. The use of a multiplicity of ozone generating units is necessary and desirable since it ensures that a sufficient volume of ozone can be generated to supply the process machines. When leakage from one of the generating units is detected, the unit can be stopped and bypassed while the power supply to the other generating units can be increased to increase their outputs such that the total output from the ozone generator is not affected.

The flow sensors utilized in the conduits at the inlet and the outlet of the ozone generator can be one of many different commercially available sensors. The output signals from the sensors can be shown on a display mounted in a control panel such that they are monitored manually by a machine operator, or more preferably, the output signals are sent to a main controller to execute any necessary actions. For instance, the output signals can be fed to a logic device in a unit controller which consists of at least an AND gate or a OR gate for outputting a signal when both sensor outputs are the same or are above a threshold value. For instance, when transistor-transistor-logic (TTL) devices are used, a voltage higher than 3.3 volts indicates a high reading or a "1" reading. When the sensor senses a voltage of less than 3.3 volts, a low TTL signal or a "0" signal is sent out as an indication. The two TTL signals obtained from the two flow sensors can thus be constantly monitored either manually by a machine operator or automatically by a logic device to ensure the proper functioning of the ozone generating device.

Figure 2:
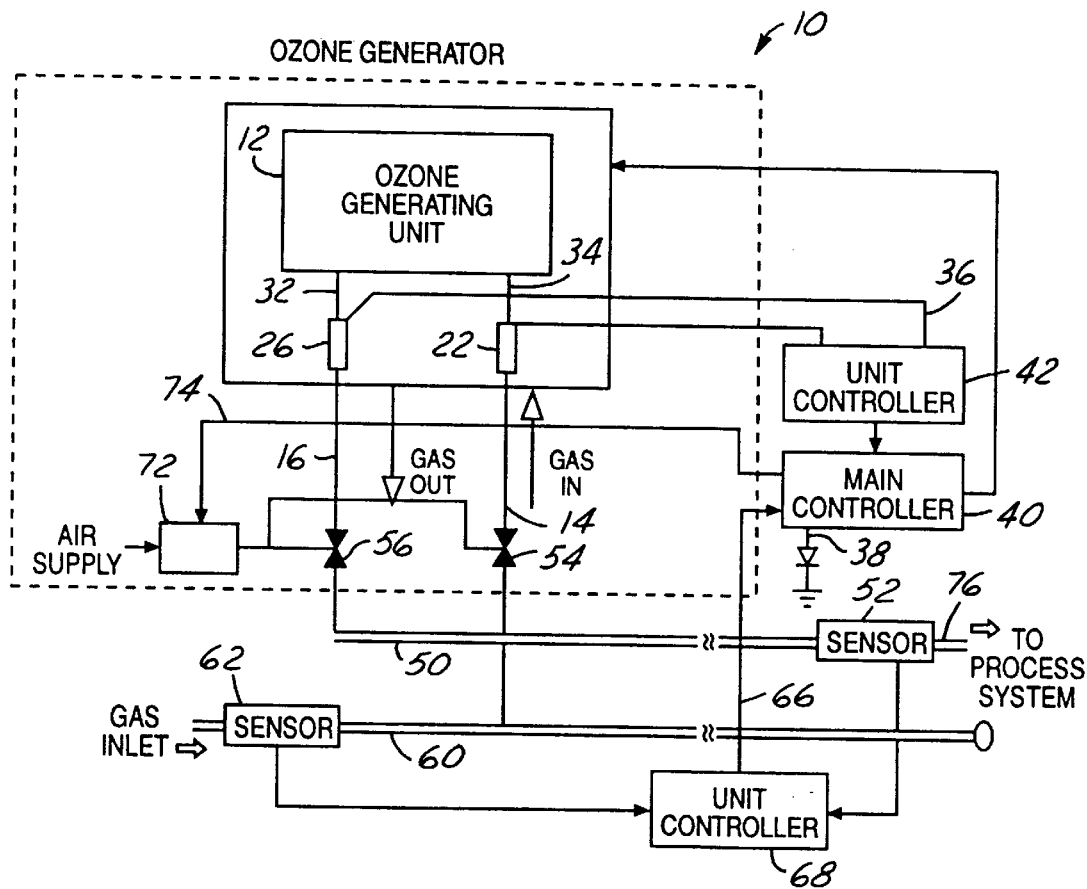
FIG. 2 is a schematic illustrating the present invention generating units, the subcontroller, the main controller and the air actuated valves.

Referring now to FIGS. 1 and 2, where schematics illustrating the present invention apparatus 10 and a parallel arrangement of the ozone generating units are shown. The apparatus 10 includes an ozone generator 12, an inlet conduit 14 to the ozone generator 12, and an outlet conduit 16 from the generator 12. At the inlet conduit 14, a flow sensor 22 is connected in fluid communication with the conduit such that the volume of gas flowing through conduit 14 can be continuously monitored. The flow sensor 22 produces an output signal which can be monitored by the unit controller 42. At the outlet conduit 16, a flow sensor 26 similar to that used on the inlet conduit 14, is used to monitor the gas flowing through outlet conduit 16. An output signal from sensor 26 can be monitored by the unit controller 42.

When a gas leakage is detected, it is an indication that ozone generated by generator 12 may have leaked out in the section 32 of the conduit after the ozone formation. It may also indicate that oxygen reactant 20 fed to the inlet conduit 14 may have leaked out in section 34 of the conduit prior to the ozone formation process. When the ozone output 18 monitored by sensor 26 is the same as the oxygen input 20, it is an indication that generator 12 is functioning properly by converting all the input oxygen 14 into output ozone 16. It should be noted that the ozone generator 12 is only used to illustrate the present invention preferred embodiment. The present invention apparatus for monitoring a gas reactor by using flow sensors 22, 26 and monitoring the sensor output signals by an unit controller 42 can be utilized on any gas reactors wherein an input gas is reacted to produce an output gas. For instance, in an application where a toxic gas such as carbon monoxide may be converted to carbon dioxide in a gas reactor by combining the former with oxygen and thus producing non-toxic carbon dioxide at the outlet end. Other toxic gas conversion processes may also utilize the present invention apparatus. In such toxic gas conversion processes, it is advantageous to utilize the present invention apparatus such that the exact volume of input gas and the exact volume of output gas can be monitored. This prevents any leakage of a toxic reactant gas at the input end by a quick determination of the flow rate at the output end and by the detection of different flow rates.

The unit controller 42 consists of a digital circuit such as an AND gate or an OR gate for determining and comparing the flow rates in the two conduits. When the output signals 34 and 36 are different, an alarm signal 38 is outputted from the main controller 40 after it has received data from the unit controller 42 for sounding an alarm 38 or flashing a warning light. The digital circuit contained in the unit controller 42 can be connected to the main controller 40 which can be mounted in the control panel on a process machine such that the identification of the ozone generating unit where a leak has been detected can be readily made. The specific ozone generating unit identified can then be shut off or bypassed by the main controller 40. The unit controller 42 can be simply constructed by an AND gate or an OR gate, for instance, a signal larger than 3.3 volts from a TTL would be recognized as a high or a "1". When both signals 34 and 36 read a high or a "1", it is an indication that the ozone generating unit 12 functions properly and that no leakage has occurred. To the contrary, when one signal reads a high and the other signal reads a low or "0", it is an indication that the flow rates in the two conduits are different and that a leakage has occurred. The flow sensors 22 and 26 used can be selected from a variety of commercially available sensors. The sensitivity requirement is approximately 1 $cm^3$/sec.

A series of ozone generating units 12, 18 and 20 are illustrated in a parallel connection arrangement in FIG. 1. It should be noted that this arrangement can accommodate at least 6, or as many as 20, ozone generating units when controlled by a single main controller 40. Each of the generating units is controlled by its own unit controller, such as the unit controller 46 shown in FIG. 1 for controlling the ozone generating unit 20. It should be noted that the unit controllers for the ozone generating units 12 and 18 are not shown for simplicity reasons. The gas outlets of ozone generating units 12, 18 and 20 are connected parallelly to a main gas outlet line 50 which is shown in FIGS. 1 and 2. A third flow sensor 52 is used to monitor the total volume of gas flowing through the main outlet 50. Similarly, the gas inlets to the generating units 12, 18 and 20 are connected to a main inlet 60 shown in FIGS. 1 and 2. The total gas flow in the main inlet 60 is monitored by a fourth flow sensor 62 which senses the total volume of reactant gas flowing through the inlet 60.

In another novel feature of the present invention, the flow rates measured by sensors 52 and 62 are compared by a unit controller 68 and the result is outputted through an output 66 to the main controller 40. This provides another unexpected and greatly improved result of the present invention novel apparatus, i.e., when the flow rate through sensor 52 and the flow rate through sensor 62 are different as determined by the unit controller 68, the main controller 40 shuts off the ozone generator 10 since the different flow rates indicate that, even though no leak is detected in the individual ozone generating units, there is a leak in the piping that connects the various ozone generating units. Such a leakage may cause serious problems to the plant facility or to the plant personnel and therefore must be immediately corrected.

Another novel feature of the present invention apparatus in that when a leakage is detected in an ozone generating unit, for instance, in unit 12, the main controller 40 which receives output from the unit controller 42 immediately shuts off the ozone generating unit 12 by operating the air actuated valves 54 and 56 which receives air supply from the air valve controller 72 when the controller in turn receives an instruction from the main controller 40 through control circuit 74. The air valve controller 70 receives its air supply from a supply tank (not shown). After the air actuated valves 54 and 56 are closed such that the ozone generating unit 12 is completely shut off, the main controller 40 sends out signals (not shown) to the other ozone generating units 18, 20 such that the power supply to the electrode in the ozone generator cell is increased and that the ozone outputs are increased from the other ozone generating units. This ensures that the total ozone output, or the ozone concentration, from the main output conduit 76 to a process machine remains constant. Any interruption or disturbance to the semiconductor fabrication process can thus be avoid.

The capability of the present invention novel apparatus for making immediate remedial actions, after the shutting down of an ozone generating unit where a leakage has been detected, enables the apparatus to provide uninterrupted ozone supply to a semiconductor fabrication process. This is a very important and desirable characteristic that is made possible by the present invention apparatus since no down time in the fabrication process will occur due to a shortage of ozone supply. When an ozone generating unit is shut off, the unit is automatically bypassed by the closing of air actuated valves such that the unit is isolated from the other generating units for maintenance and repair work.

It should be noted that while the present invention novel apparatus and method has been illustrated by an ozone generating device, the present invention novel apparatus and method can be advantageously applied to any gas generating unit. The present invention apparatus provides numerous benefits such as any gas generating sub-unit may be shut off and bypassed for maintenance and repair; the output of the product gas from the remaining generating units can be increased to make up the loss such that the total output of the gas generator is not affected; and a gas leakage in the piping systems that connects the various generating units can be detected such that the complete system may be shut down for inspection and repair without causing damages to the fabrication facility and personnel.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

1. A silent discharge ozone gas generating device equipped with a gas leakage detection and control system comprising:

at least two silent discharge ozone gas generating units connected in parallel each comprising: a gas inlet for feeding a reactant gas to said unit, a gas outlet for withdrawing a product gas from said unit, a first flow sensor in fluid communication with said gas inlet for outputting a first signal indicative of a flow rate in said gas inlet, a second flow sensor in fluid communication with said gas outlet for outputting a second signal indicative of a flow rate in said gas outlet, a unit controller for comparing said first signal to said second signal and for determining a leakage status of said gas generating unit, a main gas inlet for parallelly connecting the gas inlets of said at least two gas generating units, a main gas outlet for parallelly connecting the gas outlets of said at least two gas generating units, said main gas inlet and said main gas outlet are connected in fluid communication with a third flow sensor and a fourth flow sensor, respectively for sensing flow rates through said sensors and outputting a signal to a main controller, a main controller for receiving data from said at least two unit controllers and for shutting off gas inlet and gas outlet of at least one of said gas generating units when leakage is detected.

2. A gas generating device according to claim 1, wherein said main controller when detects a leakage and shuts off gas inlet and gas outlet of at least one of said gas generating units, increases outputs from the other one of said at least two gas generating units such that the flow rate through said main gas outlet remains substantially unchanged.

3. A gas generating device according to claim 1, wherein said main controller further receives and compares flow rate data from said third flow sensor and said fourth flow sensor and shutting off all gas generating units when said flow rate data are not the same.

4. A gas generating device according to claim 1, wherein said at least two gas generating units each comprises a multiple number of electrostatic discharge cell modules for generating ozone.

5. A gas generating device according to claim 1, wherein said at least two gas generating units each comprises six electrostatic discharge cell modules for generating ozone.

6. A gas generating device according to claim 1 further comprising an alarm means connected to said main controller and adapted for activating an alarm when a gas leakage is detected.

7. A gas generating device according to claim 1, wherein said flow sensors have a sensitivity of not more than 1 $cm^3$/sec.

8. A gas generating device according to claim 1, wherein said gas inlet and said gas outlet for the at least two gas generating units, said main gas inlet and said main gas outlet are controlled by air actuated valves.

9. A silent discharge ozone gas generating device equipped with a gas leakage detection and control system comprising:

at least two silent discharge ozone gas generating units connected in parallel each comprising: a gas inlet for feeding a reactant gas to said unit, a gas outlet for withdrawing a product gas from said unit, a first flow sensor in fluid communication with said gas inlet for outputting a first signal indicative of a flow rate in said gas inlet, a second flow sensor in fluid communication with said gas outlet for outputting a second signal indicative of a flow rate in said gas outlet, a unit controller for comparing said first signal and said second signal and for determining a leakage status of said gas generating unit, a main gas inlet for parallelly connecting to the gas inlets of said at least two gas generating units, a main gas outlet for parallelly connecting to the gas outlets of said at least two gas generating units, said main gas inlet and said main gas outlet are connected in fluid communication with a third flow sensor and a fourth flow sensor, respectively for sensing flow rates through said sensors and outputting a signal to a main controller, a main controller for receiving data from said at least two unit controllers and for shutting off gas inlet and gas outlet of at least one of said at least two gas generating units when leakage is detected, for increasing output from the other one of said at least two gas generating units such that the flow rate through said main gas outlet remains substantially unchanged, and for receiving and comparing flow rate data from said third flow sensor and said fourth flow sensor and shutting off all gas generating units when said flow rate data are not the same.

10. A gas generating device according to claim 9, wherein said at least two gas generating units each comprises a multiple number of electrostatic discharge cell modules for generating ozone.

11. A gas generating device according to claim 9 further comprising an alarm means connected to said main controller for activating an alarm when a gas leakage is detected.

12. A gas generating device according to claim 9, wherein said flow sensors have a sensitivity of not more than 1 $cm^3$/sec.

13. A gas generating device according to claim 9, wherein said gas inlet and said gas outlet for the at least two gas generating units, said main gas inlet and said main gas outlet are controlled by air actuated valves.

* * * * *